(12) United States Patent
Dallan

(10) Patent No.: US 10,981,252 B2
(45) Date of Patent: Apr. 20, 2021

(54) CLOSURE DEVICE FOR CHAMBER HOUSING LASER UNIT FOR CUTTING SHEET METAL

(71) Applicant: Dallan S.p.A., Castelfranco Veneto (IT)

(72) Inventor: Sergio Dallan, Castelfranco Veneto (IT)

(*) Notice: Subject to any disclaimer, the term of this patent is extended or adjusted under 35 U.S.C. 154(b) by 813 days.

(21) Appl. No.: 15/795,254

(22) Filed: Oct. 27, 2017

(65) Prior Publication Data
US 2018/0185966 A1 Jul. 5, 2018

(30) Foreign Application Priority Data

Dec. 30, 2016 (IT) .................... 102016000132646

(51) Int. Cl.
| | | |
|---|---|---|
| B23K 26/70 | (2014.01) | |
| F16P 1/06 | (2006.01) | |
| B23K 26/08 | (2014.01) | |
| B23K 26/12 | (2014.01) | |
| B23K 37/00 | (2006.01) | |
| B23K 26/38 | (2014.01) | |
| B23Q 11/00 | (2006.01) | |

(52) U.S. Cl.
CPC ........ B23K 26/706 (2015.10); B23K 26/0846 (2013.01); B23K 26/127 (2013.01); B23K 26/38 (2013.01); B23K 26/702 (2015.10); B23K 37/006 (2013.01); B23Q 11/0089 (2013.01); F16P 1/06 (2013.01)

(58) Field of Classification Search
CPC ............. A23K 26/706; B23K 26/702; B23K 26/0846; B23K 26/127; B23K 26/38; B23K 37/006; B23K 26/18; B23K 26/128; B23K 37/04; B23Q 11/0089; B23Q 1/012; B23Q 11/0866; F16P 1/06; B25B 11/00; E06B 7/16; E06B 7/21
USPC ............. 219/121.67; 409/134; 269/316, 266, 269/289 R; 267/41, 53, 50; 81/3.7; 277/379, 406; 49/480.1, 386, 470; 174/374; 428/122, 358; 198/860.4, 198/735.4
See application file for complete search history.

(56) References Cited

U.S. PATENT DOCUMENTS

| | | | | |
|---|---|---|---|---|
| 5,816,309 A | * | 10/1998 | Paradise | E05B 15/022 160/206 |
| 7,624,538 B2 | * | 12/2009 | Hautmann | H05K 9/0015 49/477.1 |
| 8,006,805 B2 | * | 8/2011 | Greenaway | B66B 13/303 187/333 |
| 10,391,597 B2 | * | 8/2019 | Mabee | B23Q 7/035 |
| 2002/0134773 A1 | | 9/2002 | Pratt | |

(Continued)

FOREIGN PATENT DOCUMENTS

EP 2540435 1/2013

*Primary Examiner* — Dana Ross
*Assistant Examiner* — Michael S. Poetzinger
(74) *Attorney, Agent, or Firm* — Themis Law

(57) ABSTRACT

A closure device for a chamber housing a laser units for cutting a sheet metal strip includes, in proximity of an exit slit of the strip to be machined, a bar arranged transversely to the axis of advancement of the strip, and having, at the lower edges of the major side surfaces, longitudinal edges of a U-folded plate bound thereto. The plate has a plurality of transverse slots ending before its edges. An actuator provided for a vertical movement of the bar.

2 Claims, 2 Drawing Sheets

(56) References Cited

U.S. PATENT DOCUMENTS

| | | | |
|---|---|---|---|
| 2004/0168862 A1* | 9/2004 | Greenaway | B66B 13/303 |
| | | | 187/313 |
| 2007/0095568 A1* | 5/2007 | Hautmann | H05K 9/0015 |
| | | | 174/520 |
| 2015/0273641 A1* | 10/2015 | Mabee | B23Q 7/035 |
| | | | 219/121.86 |
| 2017/0197280 A1* | 7/2017 | Timmerman | B23K 26/0876 |

* cited by examiner

CLOSURE DEVICE FOR CHAMBER HOUSING LASER UNIT FOR CUTTING SHEET METAL

FIELD OF THE INVENTION

The present invention relates to a closure device for chambers housing laser units for cutting sheet metal.

BACKGROUND OF THE INVENTION

Sheet metal strip movement equipment is known that includes a spiked conveyor belt and a unit transversely movable with respect to the advancement of the spiked belt and supporting a laser unit. The belt housing frame surfaces, orthogonal to the advancement of the strip, are provided with slits through which the strip enters and exits the machining chamber.

Such known equipment has the drawback of possibly reflecting the laser light which, during machining, passes through the slits, endangering the surrounding environment.

SUMMARY OF THE INVENTION

An object of the invention is eliminating this and other drawbacks by providing a closure device of the rear exit of the frame, that is, the exit facing the laser unit.

This object is achieved in accordance with the invention with a closure device as described hereinafter.

BRIEF DESCRIPTION OF THE DRAWINGS

The present invention is further clarified hereinbelow by disclosing a preferred embodiment thereof, provided for explanation and not limitation, with reference to the accompanying drawings, in which.

DETAILED DESCRIPTION OF A PREFERRED EMBODIMENT

Figure 1:
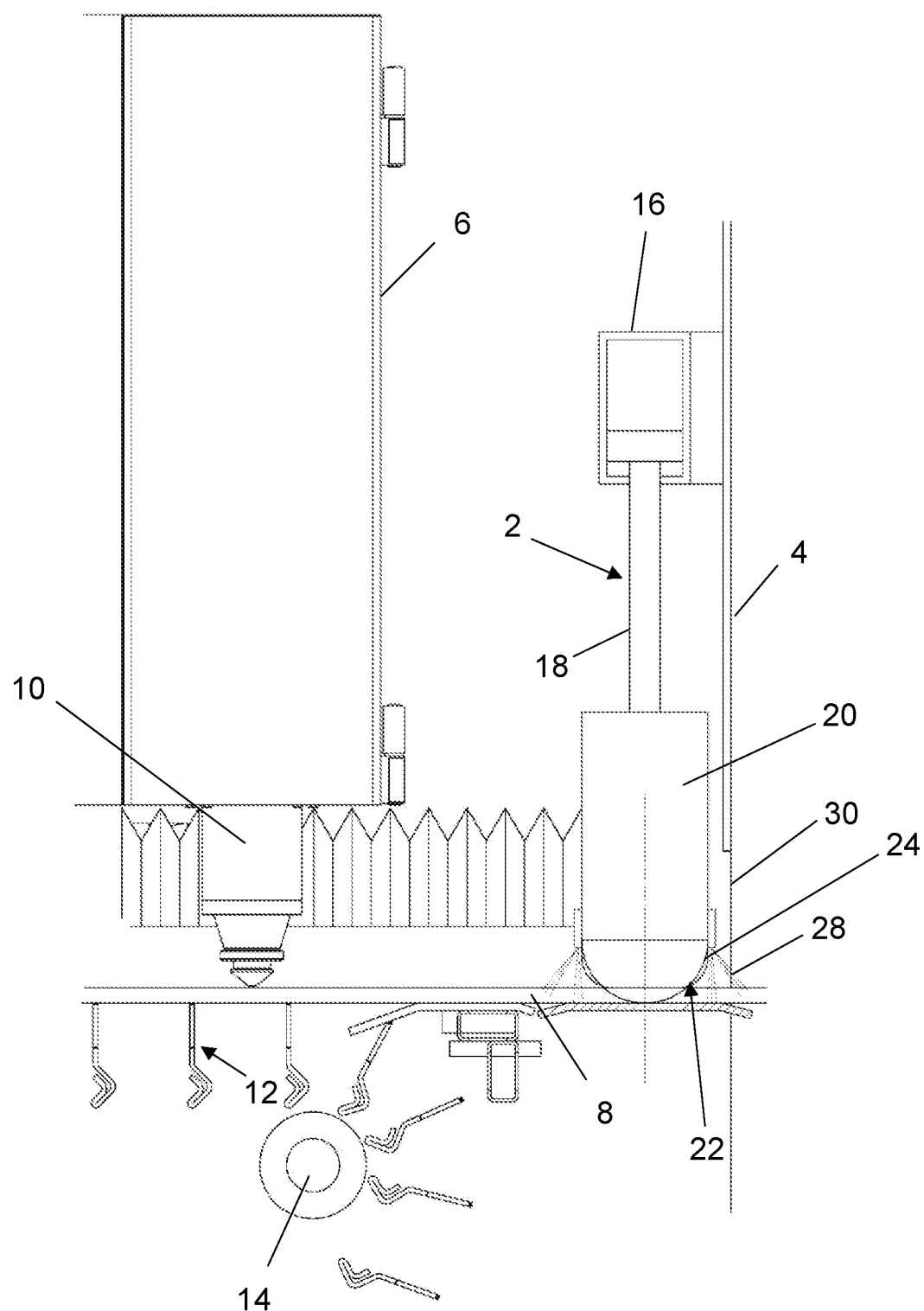
FIG. 1 shows a schematic side view of a closure device according to the invention.
Figure 2:
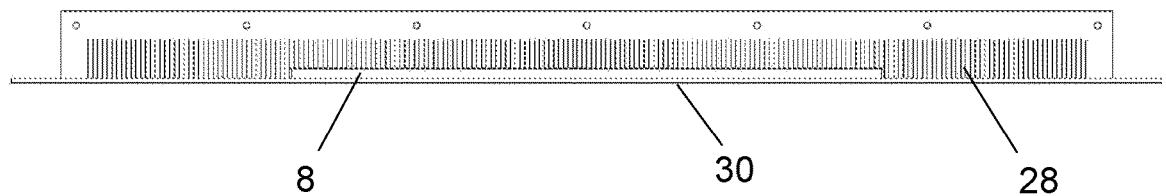
FIG. 2 shows a front view thereof.
Figure 3:
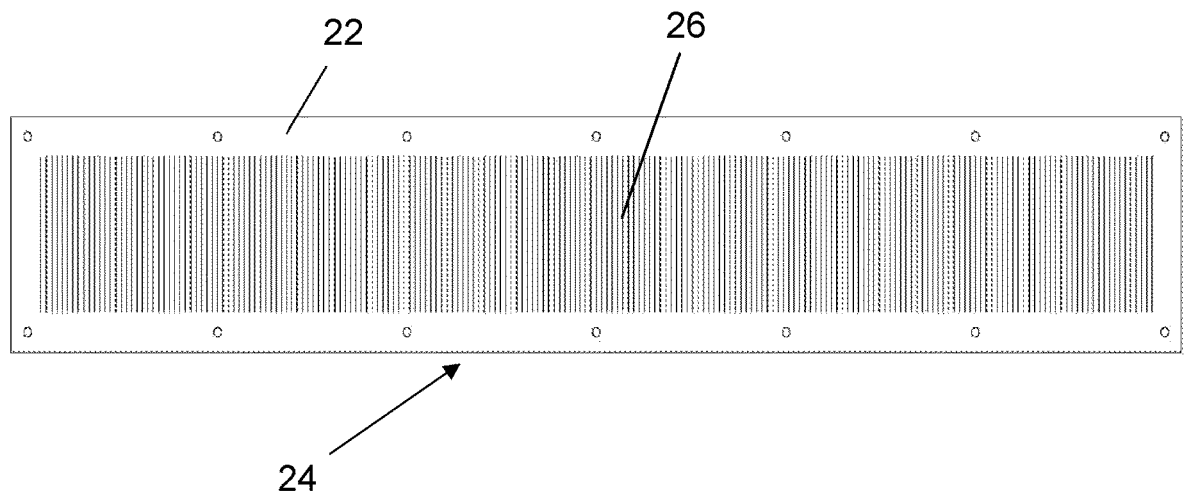
FIG. 3 shows a top view of a deformable metal press.

As shown in the figures, a closure device according to the invention is generally indicated by 2 and is applied at a wall 4 for the exit of the strip to be machined from the laser cutting chamber.

In particular, the chamber houses a wagon 6, movable in the advancement direction of a sheet metal strip 8 and supporting a laser cutting head 10 transversely movable with respect to the wagon.

The chamber further houses a traditional spiked conveyor belt 12 driven by an electric motor 14.

A closure device in accordance with the invention substantially comprises an actuator 16, such as a pneumatic or aerodynamic cylinder, having a parallelepiped bar 20 applied at a stem 18 thereof and arranged transversely to the strip advancement axis. The longitudinal edges 22 of a U-folded steel plate 24 are coupled to the lower edges of the major side surfaces of bar 20. Steel plate 24 has a plurality of transverse slots 26 ending before the edges 22.

Brushes 28 are applied at the ends of bar 20 and externally to plate 24.

The operation of the closure device provides that, during laser machining, when the front end of sheet metal sheet 8 arrives at exit 30 of the closure wall, the descent of stem 18 is commanded so that slotted portion 26 of plate 24 comes into contact with sheet 8, deforming internally and at the same time ensuring an effective holding, thereby preventing any laser beams from exiting through opening 30.

While the invention has been described in connection with the above described embodiment, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A closure device for a chamber housing a laser unit for cutting a sheet metal strip, comprising:
   a bar disposed in proximity of an exit slit of a strip to be machined, and transversely to a strip advancement axis, the bar being coupled, at edges of major side surfaces facing the strip, to longitudinal edges of a U-folded plate having a plurality of transverse slots ending before the longitudinal edges of the U-folded plate; and
   an actuator providing for a movement of the bar closer and farther from the strip,
   wherein the plate is configured to have an internal portion of the plate deform in an area of contact with the strip upon contact with the strip, thereby preventing any laser beams from exiting the chamber.

2. The closure device according to claim 1, further comprising brushes bound to the longitudinal edges of the U-folded plate.

* * * * *